United States Patent [19]

Coccodrilli, Jr. et al.

[11] Patent Number: 5,223,302
[45] Date of Patent: Jun. 29, 1993

[54] MEAT PRODUCTS HAVING IMPROVED MOISTURE RETENTION AND METHOD FOR MAKING SAME

[75] Inventors: Gus D. Coccodrilli, Jr., Yorktown Heights; Susan M. Vidal, Patterson; Fouad Z. Saleeb, Pleasantville, all of N.Y.

[73] Assignee: Kraft General Foods, Inc., Northfield, Ill.

[21] Appl. No.: 935,069

[22] Filed: Aug. 25, 1992

[51] Int. Cl.⁵ .............................................. A23L 1/317
[52] U.S. Cl. ...................................... 426/646; 426/652
[58] Field of Search ................................ 426/646, 652

[56] References Cited

U.S. PATENT DOCUMENTS

| | | | |
|---|---|---|---|
| 3,032,421 | 5/1962 | Buckholz | 426/646 |
| 3,240,612 | 3/1966 | Wolnak | 426/652 X |
| 4,202,907 | 5/1980 | Poarch et al. | 426/34 |
| 4,348,420 | 9/1982 | Lynch et al. | 426/652 X |
| 4,382,098 | 5/1983 | Bolin et al. | 426/646 |
| 4,497,845 | 2/1985 | Percel et al. | 426/646 |
| 4,789,497 | 12/1988 | Ueno et al. | 426/652 X |
| 5,028,444 | 7/1991 | Yamamoto et al. | 426/652 X |

*Primary Examiner*—Arthur L. Corbin
*Attorney, Agent, or Firm*—Linn I. Grim

[57] ABSTRACT

A ground meat product having improved moisture retention is provided by incorporating into ground meat, water and a specially prepared calcium salt of citric acid.

23 Claims, No Drawings

MEAT PRODUCTS HAVING IMPROVED MOISTURE RETENTION AND METHOD FOR MAKING SAME

This invention relates to ground meat products having improved moisture retention and methods of making these products.

BACKGROUND OF THE INVENTION

Health concerns from consumption of high levels of fat, particularly in ground meat is pushing the consumers to obtain ground lean cuts of meat significantly lower in fat content than normal cuts of meat. A major drawback in the use of lean meat is the dryness of the cooked meat (not juicy) and its lacking of the eating quality of regular products of higher fat content. If highly moisturized ground meats can be obtained after cooking, the fat content can be effectively reduced and provide a highly desirable and high quality ground meat product especially after cooking. To provide these results, much effort has gone into attempted solutions with insufficient successes to provide a high quality, highly moisturized cooked meat product. In U.S. Pat. No. 4,202,907 entitled "Sausage Products Having Improved Properties and Methods of Producing Same" there is a description of the use of non-reversible gels formed in sausage and meatball products during cooking by the reaction of enzyme activated sodium caseinate and calcium ion to provide improved organoleptic properties and retain fat and moisture within the cooked product. Another U.S. Pat. No. 4,382,098 entitled "Sausage Emulsions Containing Gluconate Salts and Process of Preparation" describes the improved emulsifying and water binding properties of sausage by incorporating therein, as a partial replacement for sodium chloride, a salt system comprising calcium or sodium gluconate in combination with an alkaline phosphate. These U.S. patents were interested in improving the physical properties such as having a firmer texture or producing a product having improved emulsifying characteristics.

In this invention, a simple but effective method is described not only to improve the moisture content of the ground meat product, cooked or uncooked, but to provide an improved ground meat product having exceptionally eating qualities. In co-pending patent applications, commonly assigned, as the present application, U.S. Ser. No. 704,500, filed May 23, 1991, now U.S. Pat. No. 5,149,551, and U.S. Ser. No. 811,192 filed Dec. 21, 1991 a finely divided special type of calcium citrate is described as an anticaking agent for dry fructose-containing beverages in the first mentioned patent application and this special type of calcium citrate is also described in the second mentioned patent application as useful for opacifying and whitening aqueous food compositions. It has been discovered that this special calcium citrate added to ground meats provided improved moisture retention especially on cooking as well as providing a calcium additive to the ground meat products.

SUMMARY OF THE INVENTION

By the invention, there is provided an edible ground meat product having improved moisture retention, lower fat content and containing a calcium supplement where water and a special calcium citrate is added to ground meat wherein the cooked finished product provides a highly desirable juicy product having high quality eating properties.

DETAILED DESCRIPTION

The invention is directed to producing an improved meat product by incorporating, by mixing or blending water and a special type of calcium citrate. The ground meat product which is used herein is meant to include any edible ground meat product which includes ground beef, pork, poultry and seafood or combinations thereof. The ground meat products can include hamburgers, meat loaf, frankfurters, ground sausages, meat balls, meat spreads and the like. Meatballs can also include mixture of comminuted or finely ground meats, meat by-products, cereals, milk products, flavors and the like.

The amount of water added to the above described ground meats can range from about 3 to about 25 weight percent, preferably about 5 to about 18 weight percent of the total meat product.

The calcium citrate compounds used in this invention are reaction products of a calcium compound selected from the group consisting of calcium hydroxide, calcium oxide and calcium carbonate, with citric acid wherein said reaction product has a mole ratio of calcium to citric acid from 2.50:2 to 2.95 to 2, preferably 2.61 to 2.92 and pH value in a 1% water slurry of said reaction product about 4 to below 7 preferably about 4.0 to about 6.5° at 25° C. The amounts of calcium citrate of this invention added to the ground meat in the form of a water dispersion can range from about 0.5 to about 5 weight percent, and preferably from about 1 to about 4 weight percent of the meat product.

In general, these calcium citrate crystals are prepared by spray drying a neutralization mixture prepared by neutralizing citric acid with a slurry of calcium carbonate or calcium oxide or calcium hydroxide in water, e.g., a slurry of calcium hydroxide under controlled conditions to assure the production of the present new calcium citrate salts. Temperature, slurry solid content, rate of mixing of reactants and agitation time before spray drying are critical parameters in determining the physical characteristics of final product.

In particular, the calcium citrate crystals are prepared by first neutralizing citric acid with calcium hydroxide while controlling the rate and conditions of the reaction as well as the degree of neutralization. In the present process, a calcium hydroxide aqueous slurry is reacted with a citric acid solution in water resulting in a strong exothermic reaction. The rate of reaction, concentration of reactants and varying conditions are all important factors in producing calcium citrate salts of the desired pH values, moisture content and particularly the desired particle size.

It is preferred to form two separate aqueous systems, one, a solution of citric acid and the second, a slurry of calcium hydroxide, calcium oxide or calcium carbonate and then mix the uniform slurry of calcium hydroxide or carbonate with the aqueous citric acid. The temperature of the mixture is not allowed to exceed about 60° C. The pH of the slurry so produced after thorough mixing should fall within the range of 4–6 and, if needed, should be adjusted to this range of pH. The slurry can be used as such or can be spray-dried or dried by other known drying steps.

The produced calcium citrate salt is very insoluble in water providing about 0.1% by weight solution at ambient temperature and slightly more soluble in hot water.

During preparation of a batch and while waiting for spray drying of the batch the salts are present in the insoluble form, a slurry of tiny crystals which form aggregates of varying particle size ranging from 5 to 100 microns. In present experience, the best products are obtained by using the following conditions.

The solids level of the aqueous slurry of calcium citrate salt is maintained at 20–26% and preferably at 22–24% by weight based on anhydrous salt. The slurry temperature during spray drying is from 80°–90° F. To avoid gel formation in the aqueous slurry, especially at temperatures below 70° F., and recrystallization which can occur on prolonged storage, spray drying of the aqueous slurry is effected within about 4–5 hours after slurry preparation. The slurry is spray dried at an inlet temperature of from about 425° F. to about 460° F. to deliver a free-flowing white powder with a moisture content of less than 6% and bulk density of from about 0.3 to about 0.7 g/cc. Extensive mixing and especially homogenization prior to spray drying should be avoided since the aggregated particles of salt may be broken down into finer crystals.

The calcium citrate crystals generally have the following characteristics:

| | |
|---|---|
| Bulk Density | 0.33–0.66 g/cc |
| Granulation | 95 through 100 mesh or 150 microns |
| Rotatap, 8 min. | 10% maximum through U.S. 400 mesh or 38 microns |
| pH (1% by weight solution) | 4.0–6.5 |
| Appearance | free-flowing, white powder |

These salts are neutral or slightly acidic and have a well-defined crystal size. The salt can be employed in the form of the anhydrous salt or the hydrated salt. In the hydrated form, the salt can usually contain up to about 13–15% by weight of water of hydration. In general, it is preferred to use the salt in lower hydrated form with less than about 10% by weight of water of hydration. Of course, the hydrated salt can be dried to any level of water of hydration using known methods. On standing, the salt does not undergo any loss or gain of water during storage.

The concentration of salt in these compositions can range from about 0.2% to about 22% by weight of the composition.

The calcium citrate employed in the present invention is in the form of small platelet crystals. The average length of the crystals is below 3.0 microns, preferably about 1.5 microns, width below 2.0 microns, preferably about 1 micron and thickness below 1 micron, preferably 0.1 to 0.2 micron. During preparation, clusters of these tiny platelets aggregate together to form spherical particles that range from about 2 to about 50 microns in diameter. Such clusters are readily separable by mechanical stirring in water of by merely allowing the clusters to stand in water for protracted periods of time, e.g., overnight at room temperature. A most efficient method for reducing the clusters to the individual platelets is the use of mechanical shear, as provided by a ball mill. Other mechanical stirring means that can be employed include homogenizers, microfluidizer or colloid mills.

When mixed with water, particularly at levels above about 10% by weight, the present spray-dried calcium citrate salt platelets cause a significant increase in the viscosity of the mixture. Thus, at 15% to 20% by weight the aqueous calcium citrate compositions are in the form of thick pastes resembling soft cheeses and margarines in consistency. At 20% and higher levels, the mixtures tend to solidify, especially when highly efficient mechanical shear is used.

In contrast with the results obtained with the special calcium citrate crystals used in this invention, commercial tricalcium dicitrate, whether in hydrated form (13% $H_2O$) or after rigorous drying, does not exhibit the same properties and is ineffective when tested side-by-side with the calcium citrate used in this invention, or as an additive to aqueous food composition. Without being bound to any theory of operation of the present invention, the phenomena observed with the present new salts is attributable to the particle size of the salt crystals, relying almost completely on the shape, number and geometrical arrangement of the calcium citrate crystals as they disperse in the water phase of the new food compositions of this invention.

An additional feature of this invention is a meat product having an improved texture wherein a polysaccharide hydrocolloid or combinations thereof can be added to the ground meat, water and the special type of calcium citrate as defined herein. The polysaccharide hydrocolloids as used can range in amounts from about 0.01 to about 0.5, preferably 0.01 to about 0.25 weight percent of finished the meat product. The polysaccharide hydrocolloids used in this invention are preferably water-soluble, non-gelling gums such as xanthan, guar, CMC (carboxymethyl cellulose) and the like. The preferred polysaccharide hydrocolloids include xanthan or guar and combinations thereof.

The incorporation of milk solids with hydrocolloid gums improves the eating quality of ground meat, especially hamburgers. The milk solids in the ground meat do not appear responsible for the juiciness of the cooked meat, the products of this invention. The presence of the special calcium citrate provides the highly desired juiciness properties in the cooked product. Commercial tricalcium dicitrate does not provide the improvements in ground meat products as contrasted with the use of the special calcium citrate used in this invention.

The following examples are provided to further illustrate the present invention.

EXAMPLE 1

A calcium citrate sample was prepared by reacting 2763.8 lbs. of citric acid with 1600 lbs. calcium hydroxide (97–98% $Ca(OH)_2$ by analysis) in the presence of 1433 gallons of water. The mole ratio of calcium hydroxide to citric acid was very slightly less than 3:2, actually 2.92:2. The citric acid (Pfizer fine granular, food grade) was mixed in a large batch tank with 675 gallons of cold water. The calcium hydroxide (Mississippi Lime, hydrated lime food code) was mixed in a separate batch tank with 675 gallons of cold water. The calcium hydroxide slurry is then pumped into the citric acid solution at a rate to deliver the entire slurry in 10–15 minutes. It is necessary to have good agitation during the entire reaction and mixing process. The remaining 83 gallons of water is used to rinse the calcium hydroxide tank and transport lines. Due to the heat of reaction, the temperature of the resultant slurry was increased from an initial value of 15° C. (60° F.) to a maximum of 57° C. (134° F.). After the reaction is complete, the batch is cooled to 80°–90° F. The final pH of this concentrated slurry (22% calcium citrate, dry basis) should fall within the range 3.8–4.6 or can be adjusted up or down using the reacting ingredients. The slurry is then dried via spray drying utilizing a rotary wheel 7600 pm). The outlet temperature was adjusted to 225° F. and the inlet temperature was 450° F.

The calcium citrate powder obtained after spray drying was a free-flowing white powder with a moisture less than 6.0% and a bulk density in the range 0.33–0.65 g/cc. The pH of 1% slurry in water was 5.5. 95% of the powder passed through U.S. 200 mesh.

EXAMPLE 2

Spray-dried calcium citrate produced in accordance with Example 1 was mixed with water and then micromilled to obtain a fairly thick paste which does not require refrigeration using the following procedure.

Calcium citrate (2265 g.) was added to 9656 g. of water at room temperature. A fairly gritty slurry was obtained (19% calcium citrate, 81% water) that was maintained in suspension by sing an electric stirrer. The suspension was then pumped and milled using a Dyno-Mill filled with glass beads (Type KDL, manufactured by Willy A. Bachofen, AG Machinenfabrik, Basel-Switzerland). One pass through the Dyno-Mill was sufficient to produce a fairly smooth paste. This sample is stable for several months whether refrigerated or stored at room temperature. There was no crystal growth or loss of smoothness.

EXAMPLE 3

A large quantity of 95% lean ground sirloin beef (fat level is 5%) is split into four portions. Each portion was treated as follows:

| | |
|---|---|
| Control A: | 600 g lean ground beef, as received, no additives. |
| Control B: | 600 g lean meat + 100 g water, the mixture was blended for 3 minutes in a Hobart mixer. |
| Variant 1: | 600 g lean ground meat + 12 g calcium citrate spray dried powder of Example 1 + 100 g water. The calcium citrate was added to the water in a Hobart mixer and allowed to blend to a uniform suspension (2 minutes). The meat was then added and blended an additional 4 minutes. |
| Variant 2: | 600 g lean ground meat + 34 g water + 66 g calcium citrate of Example 1 micromilled hard paste (19% calcium citrate in water, as described in example 2). The micromilled calcium citrate paste was mixed with the water and blended in a Hobart mixer until uniform (thick paste) The ground lean meat was then added and allowed to mix for an additional 4 minutes. |

100 g hamburgers of 12 cm diameter were produced from both the variants and the two controls. Some of the burgers were frozen immediately after preparation and the rest were refrigerated. After 48 hours, both preparations were brought to room temperature, weighed and cooked for exactly the same time using a Black and Decker Grill/Waffle Maker on the highest temperature setting. The weight of each burger just before and immediately after cooking is recorded and is given in the following Table I.

TABLE I

| COMPOSITION AND WEIGHT OF HAMBURGERS BEFORE AND AFTER COOKING | | | | |
|---|---|---|---|---|
| | CONTROL A | CONTROL B | VARIANT 1 (Dry Calcium Citrate) | VARIANT 2 (Wet Calcium Citrate) |
| Weight of Fresh Burger | 100 g | 100.0 g | 100.0 g | 100.0 g |
| Weight of Lean Beef | 100 g | 85.71 g | 84.27 | 85.7 |
| Weight of Water | 0.00 | 14.29 | 14.04 | 12.05 |
| Weight of Calcium Citrate | 0.00 | 0.00 | 1.69 | 1.79 |
| *Frozen Burgers* | | | | |
| Weight After Cooking | 99.4 g | 98.9 g | 99.7 g | 99.2 g |
| Weight After Cooking Yield % | 84.8 | 71.1 | 80.7 | 76.2 |
| (Cooked Wt./Raw Meat Wt.) | 84.8% | 83.0% | 95.8% | (88.9%)* |
| *Duplicate Frozen* | | | | |
| Weight Before Cooking | 99.4 g | 98.2 g | 99.7 g | 98.7 g |
| Weight After Cooking | 84.8% | 72.3% | 77.9% | 79.0% |
| Yield (%) | 84.8% | 84.4% | 92.4% | 92.2% |
| *Refrigerated Hamburgers* | | | | |
| Weight Before Cooking | 99.8 g | 99.4 g | 100.0 g | 100.0 g |
| Weight After Cooking | 85.7 | 76.2 | 81.9 | 83.0 |
| Yield (%) | 85.7% | 88.9% | 97.2% | 96.8% |

NOTE (*)
This hamburger was turned over an extra turn in the cooking step to align it.

It is clearly obvious that the inclusion of a very small level of the special type of calcium citrate of Example 1 (<2% per weight) increased the yield of the hamburger from roughly a 85% to as high as 97%. The average of six variant experiments is 93.9% vs. 85.1% for the three controls. Addition of water alone (without the special calcium citrate) did not increase the yield at all (average yield of 3 experiments is 85.4%) whether kept refrigerated or frozen for 2 days. The average of 93.9% yield for the special calcium citrate samples include the burger that was turned an extra time, excluding this sample the average yield would be 94.8% vs. 85.1% for the control. Interestingly enough the sample with dry special calcium citrate was perceived as the most moist and juicy of all burgers followed by the wet milled calcium citrate. The control sample with added water was the least acceptable followed clearly by Control A (100% meat). The inclusion of special calcium citrate and water significantly increased the eating quality of the low fat hamburgers.

EXAMPLE 4

Level of Calcium Citrate in Lean Meat

In the present series of experiments the level of water and the special calcium citrate of Example 1 added to 95% lean ground sirloin were varied. The calcium citrate was added as a dry powder to the ground meat followed by water additions. As in example 3, the meat mixture was then blended for 3-4 minutes in a Hobart mixer. 100 g hamburgers (12 cm diameter) were prepared from the various meat samples as shown below. All samples were frozen as soon as prepared and evaluated 2-3 days after freezing.

The following Table provides the cooking and yield values as an average of 4 burgers in each case.

TABLE II

LEVEL OF CALCIUM CITRATE IN LEAN GROUND MEAT
Control #1 - Lean ground sirloin (95% lean)
Sample #1 - 500 grams meat + 5 grams dry calcium citrate + 83.3 grams H$_2$O
Sample #2 - 500 grams meat + 10 grams dry calcium citrate + 83.3 grams H$_2$O
Sample #3 - 500 grams meat + 25 grams dry calcium citrate + 150 grams H$_2$O

|  | CONTROL | SAMPLE 2 | SAMPLE 3 | SAMPLE 4 |
|---|---|---|---|---|
| Weight of Fresh Burger | 100.0 g | 100.0 g | 100.0 g | 100.0 g |
| Wt. of Lean Meat | 100.0 g | 85.03 g | 84.32 g | 74.07 g |
| Wt. of Water | — | 14.12 g | 14.00 g | 22.23 g |
| Wt. of Cal. Citrate | — | 0.85 g | 1.68 g | 3.70 g |
| Frozen Hamburgers |  |  |  |  |
| Wt. Before Cooking | 99.13 g | 98.87 g | 98.4 g | 96.2 g |
| Wt. After Cooking | 79.13 g | 75.20 g | 76.17 g | 68.6 g |
| Yield (%) |  |  |  |  |
| (Cooked wt./raw meat wt.) | 79.13 | 88.45 | 90.33 | 92.61 |

The Sample containing about 2% of special calcium citrate was preferred in taste tests. Again, as in Example 3, the inclusion of the special calcium citrate increased the yield of cooked hamburger by about 10 points on the average as compared with the control.

EXAMPLE 5

Effect of Fat Content in Meat

Example 4 was repeated but using 75% lean ground meat instead of the 95% lean sirloin meat used in Example 5. Again, the special calcium citrate of Example 1 was added as a dry powder to the ground meat followed by water addition. The same hamburger size, weight and cooking procedures were followed as in Examples 3 and 4. All the hamburgers were frozen for 2-3 days before thawing and cooking.

TABLE III

Control - Ground Meat, 75% lean
Variant - 600 g Ground Meat, 75 lean + 12 g calcium citrate of Example 1 + 100 g water

|  | CONTROL | VARIANT |
|---|---|---|
| Weight of the Fresh Burger | 100.0 g | 100.0 g |
| Weight of lean meat | 100.0 g | 84.27 g |
| Weight of water | — | 14.05 g |
| Weight of calcium citrate | — | 1.68 g |
| Frozen Hamburger |  |  |
| Weight before cooking | 98.65 g | 97.6 g |
| Weight after cooking | 79.15 g | 75.36 g |
| Yield (%) |  |  |
| (Cooked wt./raw meat weight) | 79.15% | 89.42% |

Again the yield of the special calcium citrate containing hamburger is about 10 points higher than the control (89.4 vs. 79.2%) irrespective of the fat content of the ground meat (75% or 95% lean meat). The variant was more moist than the control.

EXAMPLE 6

Incorporation of Calcium Citrate and Gums in Lean Meat Hamburgers

This Example is very similar to Example 3 except for the combined effect of the moisturization properties of the special calcium citrate and the taste modification of food gums.

Ground Sirloin, 95% lean, was used in these experiments. As in Example 3, the special calcium citrate of Example 1 was first dispersed in water and then the lean ground meat was added to it. When gums are used, they were dispersed in water together with the calcium citrate first and then the meat added to this aqueous phase.

The composition of the different hamburgers are given in the following table.

TABLE IV

LEVEL OF CALCIUM CITRATE IN LEAN GROUND MEAT
Control - Ground Sirloin, 95% lean
Sample #2 - 600 g meat, 12 g special calcium citrate, soaked in 100 g H$_2$O
Sample #3 - 600 g meat, 12 g special calcium citrate, 100 g H$_2$O, 0.12 guar gum, 0.12 g xanthan gum
Sample #4 - 600 g meat, 0.12 g guar gum, 0.12 g xanthan gum and 100 g H$_2$O

|  | CONTROL | SAMPLE 2 | SAMPLE 3 | SAMPLE 4 |
|---|---|---|---|---|
| Weight of Fresh Burger | 100.0 g | 118.6 g | 118.0 g | 116.6 |
| Wt. of Lean Meat | 100.0 g | 100.0 g | 100.0 g | 100.0 |
| Wt. of Water | — | 16.6 g | 16.6 g | 16.6 |
| Wt. of Cal. Citrate | — | 2.0 g | 2.0 g | — |
| Wt. gums (xanthan + guar) |  | — | 0.04 g | 0.04 |
| Frozen Burgers |  |  |  |  |
| Wt. Before Cooking (thawed) | 98.2 g | 116.1 g | 116.5 g | 112.9 |

TABLE IV-continued

LEVEL OF CALCIUM CITRATE IN LEAN GROUND MEAT

Control - Ground Sirloin, 95% lean
Sample #2 - 600 g meat, 12 g special calcium citrate, soaked in 100 g H₂O
Sample #3 - 600 g meat, 12 g special calcium citrate, 100 g H₂O, 0.12 guar gum, 0.12 g xanthan gum
Sample #4 - 600 g meat, 0.12 g guar gum, 0.12 g xanthan gum and 100 g H₂O

|  | CONTROL | SAMPLE 2 | SAMPLE 3 | SAMPLE 4 |
|---|---|---|---|---|
| Wt. After Cooking Yield (%) | 86.9 | 98.2 g | 100.0 g | 90.0 |
| (Cooked wt./raw meat wt.) | 86.9% | 98.2% | 100.0% | 90.0% |

Again the inclusion of special calcium citrate, increased moisture content of the cooked hamburgers. It provided juiciness to the lean meat hamburgers. The gums by themselves did not significantly increase moisture retention as seen by comparing Sample 4 (no calcium citrate) with Sample 2 (citrate, no gum) and Sample 3 (citrate+gums). An interesting finding is that a combination of small levels of gums and calcium citrate of this invention, enhanced the taste/eating quality of the cooked hamburgers. The special calcium citrate provided the moisture (juiciness) retention and the gums improved the juiciness of the burgers by modifying the texture of the cooked meat.

EXAMPLE 7

Two levels of an aqueous gums/milk solids paste were used, namely 2 and 4%. In addition, the cook yield and quality of hamburgers are recorded here for the gums/milk containing hamburger in the presence and absence of calcium citrate of this invention.

The gums/milk solids paste was prepared as follows: 1 g xanthan gum, 1 g guar gum and 12 g non-fat dry milk were added to 86 g of water. The mixture was heated first until all the solids dissolved, and allowed to cool for ½ hour. A paste was obtained and is designated the code MG paste (milk/gum paste) in this Example. The appropriate weight of the MG paste was added to the lean ground meat and mixed for 3 minutes in a Hobart mixer. When special calcium citrate of Example 1 is included, it is added as a dry powder to the ground meat (as in Examples #4 and #5).

The composition of the hamburger lots prepared are given below. In addition, the weight of the fresh, frozen/thawed and cooked hamburgers are given also.

TABLE V

COMBINATION OF MILK SOLIDS/GUM AND SPECIAL, CALCIUM CITRATE, MEAT IS A 95% LEAN SIRLOIN GROUND BEEF (5% FAT)

Sample #1 - Meat/2% MG/Water (500 g meat, 10.0 g MG paste, 10.0 g water)
Sample #2 - Meat/4% MG (500 g meat, 20.0 g MG)
Sample #3 - Meat/Special Calcium Citrate MG (500 g meat, 71.3 g water, 10 g calcium citrate, 11.8 g MG)

|  | SAMPLE 1 | SAMPLE 2 | SAMPLE 3 |
|---|---|---|---|
| Weight of Fresh Burger | 104.0 g | 104.0 g | 118.6 g |
| Wt. of Lean Meat | 100.0 g | 100.0 g | 100.0 g |
| Wt. of Water | 2.00 g | — | 14.26 g |
| Wt. of Special Calcium Citrate | — | — | 2.00 g |
| Wt. of MG paste | 2.00 g | 4.00 g | 2.36 g |
| Frozen Hamburgers |  |  |  |
| Wt. Before Cooking | 101.6 g | 101.95 g | 111.2 g |
| Wt. After Cooking Yield (%) | 84.6 g | 85.3 g | 93.55 g |
| (Cooked wt./raw meat wt.) | 84.6% | 85.3% | 93.6% |

The incorporation of the milk solids/gums paste improved the eating quality of all the three cooked hamburger Samples of this Example. However, the presence of special calcium citrate is responsible for moisture retention (juiciness of the cooked meat). The special calcium citrate is the ingredient responsible for increased yield. This is evident when comparing Samples 1 and 2 with Sample 3. Increasing the MG paste content from 2 to 4 g/100 g lean meat did not significantly increase the yield of the cooked hamburgers (84.6 vs. 85.3%). However, inclusion of the special calcium citrate increased the cooked yield to 93.6%, more than 8 points higher than Samples void of calcium citrate.

EXAMPLE 8

Special Calcium Citrate of Example 1 V. Commercial Tricalcium Dicitrate in Lean Meat In this Example, the special calcium citrate (Example 1) is compared with a commercially known Tricalcium dicitrate in the effect of moisture retention in cooked lean meat products. As in the previous Examples, the hamburgers were prepared from 95% lean ground sirloin. Both types of calcium citrate were added to water and allowed to hydrate for a 1-hour period after which the meat would be added and mixed in a Hobart mixer on the lowest setting for 4 minutes even if no additions were made to the meat. Hamburger patties were prepared to contain 100 grams of meat. Patties were frozen overnight, removed from the freezer and allowed to thaw prior to cooking.

TABLE VI

Sample #1- 2% Special Calcium Citrate Example 1 - 500 g meat, 10 g Special Calcium Citrate, 83 g water
Sample #2 - 2% Commercial Tricalcium Dicitrate - 500 g meat, 10 g Tricalcium Dicitrate, 83 g water
Sample #3 - Meat/H$_2$O - 500 g meat, 83 g water
Sample #4 - Control (100% meat)

*Weights listed below are an average of 2-3 samples

|  | SAMPLE 1 (SPECIAL CALCIUM CITRATE) | SAMPLE 2 (COMMERCIALLY AVAILABLE TRICALCIUM DICITRATE) | SAMPLE 3 (WATER) | CONTROL |
|---|---|---|---|---|
| Weight of Fresh Burgers | 118.6 g | 118.6 g | 116.6 g | 100.0 g |
| Weight of Lean Meat | 100.0 g | 100.0 g | 100.0 g | 100.0 g |
| Weight of Water | 16.6 g | 16.6 g | 16.6 g | 0 |
| Weight of Ca Citrate | 2.0 g | 2.0 g | 0 | 0 |
| Frozen Hamburgers | | | | |
| Weight Before Cooking | 117.1 g | 116.9 g | 114.2 g | 98.8 g |
| Weight After Cooking | 96.1 g | 90.5 g | 89.4 g | 78.3 g |
| Yield (%) | | | | |
| Cooked Wt./Raw Meat Wt. | 96.1% | 90.5% | 89.4% | 78.3% |

The inclusion of the special type of calcium citrate with added water in Sample 1 above provided increased moisture content of the cooked hamburger and also provided juiciness to the lean meat hamburger at yields of 96.1%. The inclusion of commercial Tricalcium dicitrate (not included in the claims of the present invention) with added water, in lean meat produced a product in Sample 2 no better in yield than a similar product with added water but without any calcium citrate additive as described in Example 3.

What is claimed is:

1. A meat product having improved moisture retention comprising an edible ground meat, water incorporated in said ground meat ranging from about 3 to about 25 weight percent of said meat product and about 0.5 to about 5 weight percent of said meat product of a reaction product of a calcium compound selected from the group consisting of calcium hydroxide, calcium oxide and calcium carbonate with citric acid wherein said reaction product has a mole ratio of calcium to citric acid from 2.5:2 to 2.95:2 and a pH value in a 1% water slurry of said reaction product of from about 4 to below 7 at 25° C.

2. The product of claim 1 wherein the water incorporated in said ground meat ranges from about 5 to about 18 weight percent and the reaction product ranges from about 1 to about 4 weight percent of said meat product and has a mole ratio of calcium to citric acid from 2.61:2 to 2.92:2.

3. The cooked product of claim 2.

4. The product of claim 1 wherein the reaction product has a pH value in a 1% water slurry of from about 4.0 to about 6.5.

5. The cooked product of claim 1.

6. The product of claim 1 which also contains one or more polysaccharide hydrocolloids in amounts ranging from about 0.01 to about 0.5 weight percent.

7. The cooked product of claim 6.

8. The product of claim 6 wherein the polysaccharide hydrocolloid is a guar gum.

9. The cooked product of claim 8.

10. The product of claim 6 wherein the polysaccharide hydrocolloid is a xanthan gum.

11. The cooked product of claim 10.

12. The product of claim 1 which also contains one or more polysaccharide hydrocolloids in amounts ranging from about 0.02 to about 0.25 weight percent.

13. The cooked product of claim 10.

14. The product of claim 1 wherein the ground meat product is selected from the group consisting of hamburger, meat loaf, frankfurters, poultry, sausage, meat balls, meat spreads, poultry spreads and seafood spreads.

15. The cooked product of claim 14.

16. The product of claim 1 wherein the ground meat is hamburger.

17. The cooked product of claim 16.

18. The product of claim 1 wherein the ground meat is made in the form of a frankfurter.

19. The cooked product of claim 18.

20. The product of claim 1 wherein the ground meat is sausage.

21. The cooked product of claim 20.

22. A method for preparing a meat product having improved moisture retention by incorporating in ground meat about 2 to about 25 weight percent water and about 0.5 to about 5 weight percent of said meat product of a reaction product of a calcium compound selected from the group consisting of calcium hydroxide, calcium oxide and calcium carbonate with citric acid wherein said reaction product has a mole ratio of calcium to citric acid from 2.50:2 to 2.95:2 and a pH value in a 1% water slurry of said reaction product of about 4 to below 7 at 25° C.

23. The method of claim 22 wherein said water incorporated in said ground meat ranges from about 5 to about 18 weight percent of said meat product and said reaction product ranges from about 1 to about 4 weight percent of said meat product.

* * * * *